Aug. 31, 1948.  G. J. HENRY  2,448,429
PRESSURE RELIEF VALVE
Filed Oct. 29, 1945
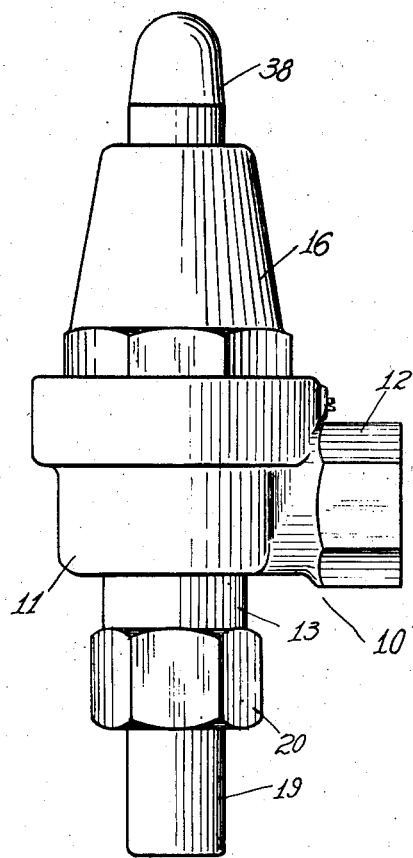
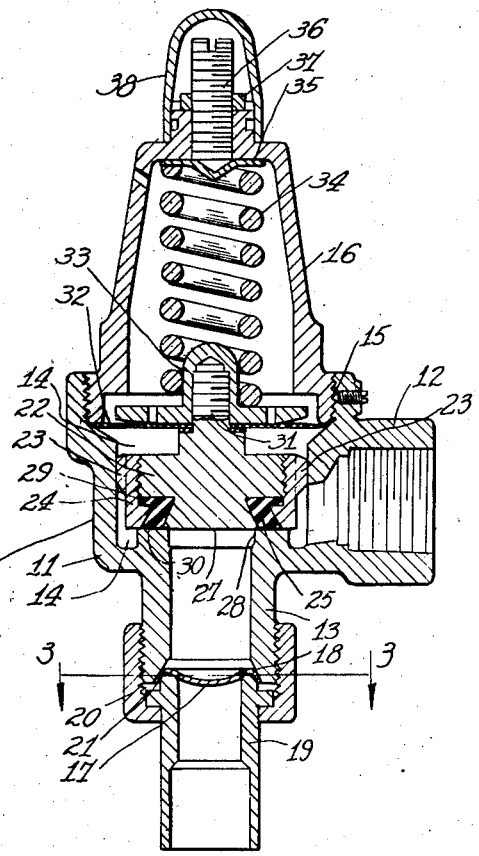
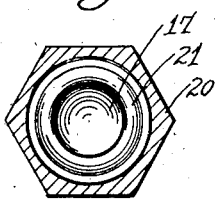
INVENTOR.
Guy J. Henry
BY
Cromwell, Greist & Warden
ATTORNEYS Patented Aug. 31, 1948

2,448,429

UNITED STATES PATENT OFFICE 2,448,429

PRESSURE RELIEF VALVE

Guy J. Henry, Chicago, Ill.

Application October 29, 1945, Serial No. 625,253

3 Claims. (Cl. 137—53)

This invention relates to improvements in a relief valve for use in fluid pressure systems.

It is an object of the invention to provide a valve for relieving pressure from the high or low pressure side of a fluid system to atmosphere, or from the high pressure side to the low pressure side, which valve seats positively under a differential pressure action.

It is a further object to provide a differential pressure, diaphragm controlled relief valve of the type described incorporating a blowout or rupture disk sealing the discharge side.

It is a still further and more specific object to provide a diaphragm type, positive seating pressure relief valve which is very fast and positive in seating after relieving pressure and which operates on a very small differential of pressure between its opening and closing pressures, being characterized by a snap closing action which eliminates wire drawing at the valve seat.

Yet another object is to provide a relief valve of the type described, having an improved flexible seat and limit stop means to control valve closing movement whereby to prevent distortion of the seat.

A still further object is to provide a relief valve of large capacity in relation to its size, in which the orifice is unobstructed by guide or other means such as are found in many existing relief valves.

The foregoing statements are indicative in a general way of the nature of the invention, but other and more specific objects will be apparent to those skilled in the art upon a full understanding of the construction and operation of the device.

A single embodiment of the invention is presented herein for the purpose of exemplification, but it will be appreciated that the invention is susceptible of incorporation in other modified forms coming equally within the scope of the appended claims.

In the drawings,

Fig. 1 is a view in side elevation of the valve of the invention;

Fig. 2 is a view in vertical section centrally of the valve as illustrated in Fig. 1;

Fig. 3 is a sectional view on a line corresponding to line 3—3 of Fig. 2; and

Fig. 4 is a fragmentary sectional view generally similar to Fig. 2, illustrating the valve in open or partially open position.

The majority of existing pressure relief valves are characterized by a lack of sensitivity with respect to the over-pressure necessary to fully open the valve, or by low volumetric capacity, or by slow action in reseating after the pressure has returned to normal, or by a tendency to leak after prolonged use, resulting either from wire drawing at the valve port or permanent distortion of the non-metallic valve seat. One or more or all of these drawbacks have characterized practically all direct acting relief valves.

The present invention provides a positive seating relief valve having a diaphragm or differential pressure operating mechanism which affords great sensitivity in action as regards the degree of over-pressure necessary to fully open the valve; in which the valve seat itself is externally guided, to eliminate obstruction of the valve port or orifice, with resultant improved capacity; and in which reseating occurs with a rapid snap action to eliminate destructive wire drawing at the orifice. Furthermore, the valve embodies an improved flexible seat construction and limit means controlling the travel thereof to prevent undue and objectionable permanent distortion of the seat.

In combination with these features, the valve embodies a blowout or rupture disk on the discharge side of the valve serving to normally seal the same against leakage, which disk is of sufficiently readily frangible material to give way upon a predetermined excess of pressure over the valve unseating pressure, to thereby void the over-pressure to atmosphere or permit escape from a higher pressure condition to a lower pressure condition, depending upon the particular installation in which the valve is employed.

Referring to the drawings, the reference numeral 10 designates the present valve. In constructing this valve, a cast or forged body or housing 11 is employed, having a lateral tapped inlet fitting 12, an externally threaded, vertical discharge fitting 13, and a hollow valve chamber 14 intermediate these fittings. The open top of the body is internally threaded at 15 for the reception of a cast or forged top housing 16 between which housing and body 11 the diaphragm control member (to be described) is clamped.

The reference numeral 17 designates a thin dished rupture disk or blowout member of frangible metal, plastic or other material, which is clamped between the lower flared mouth 18 of discharge fitting 13 and a separate outer discharge element 19. A suitable union 20 threaded on the discharge fitting is employed to clamp the parts in the assembled relation shown. The rupture disk 17 has a curled periphery 21 for ease in positioning and to permit an effective grip on the disk between fitting 13 and member 19. The latter may discharge to atmosphere or to any line in which the pressure is lower than in the fitting 13, once the valve is opened, as will be described.

The reference numeral 22 designates a slidable valve body guided in chamber 14 by a plurality of external, laterally projecting lugs or ears 23. These lugs are carried by a clamp and stop ring 24 which is threaded on the valve body 22. Ring 24 is employed to clamp an annular valve face 25 to the valve body, surrounding said valve seat, as illustrated in Fig. 2; furthermore, said clamp ring is coplanar with the lower edge of body 22 and the resilient annular face 25 projects downwardly below the same. The ring engages the valve port (to be described) to limit vertical downward movement of the valve; hence, the action of the diaphragm controlled valve is an effectively guided one both with reference to elimination of lateral shift from its line of axial travel in chamber 14 and with reference to the extent or throw of such travel. Exact uniformity of seating and repeated reseatings are insured.

An annular valve port or orifice 27 opens upwardly in the chamber 14, said port being surrounded by an annular valve seat engaging ledge 28 of substantial radial thickness, which ledge is contacted by the valve face 25 in the closed position of the valve. As illustrated in Fig. 2, the valve face 25 has a radially directed circumferential clamping flange 29 which is secured between clamp ring 24 and the valve body 22, and an axially extending, somewhat flared annular lip 30 which projects below the valve body and engages the ledge 28. Fig. 4 illustrates this lip in relaxed condition. It will be appreciated that as the valve 22 is thrust downwardly, the face 25 will be compressed substantially, being of a flexible or resilient material, such as rubber or synthetic rubber, a special composition, or the like, and the lip 30 curls and compacts sufficiently under such compression to the form illustrated in Fig. 2, to enable a close sealing engagement at high unit pressure with the ledge 28. Further downward movement beyond a predetermined stroke is limited by engagement of the lower end of ring 24 with the ledge 28 of the port. This prevents undue permanent distortion of the face 25, the latter retaining full flexibility during the life of the valve.

At its upper side, valve body 22 is provided with a stem 31 which extends through a flexible, multiply diaphragm 32 and is threadedly received in a diaphragm backing nut 33. Said diaphragm is peripherally clamped between top housing 16 and body 11 and the valve body to which it is centrally secured is urged downwardly, so as to normally engage face 25 on the valve port, by means of a predeterminedly loaded coil compression spring 34 centered on the nut 33. At its upper end this spring bears against a pressure disk 35; this may be adjusted to regulate the degree of compression of spring 34 by means of a set screw 36 threaded in the top housing axially of the spring and a lock nut 37. Spring 34 may be of relatively light strength considering the pressures controlled, for reasons which will appear. The screw and lock nut are housed in a seal cap 38 held in place by any suitable means, such as a wire and lead seal.

In operation, with the proper adjustment of spring 34, the valve face 25 effectively prevents flow of fluid through port 27 until a maximum pressure in the inlet side is reached and exceeded, the rupture disk 17 the while serving to retain any possible leakage. As distinguished from the conventional direct-acting valve wherein the loading spring must resist the total pressure on the full area on the face, in the present indirect acting diaphragm valve the spring 34 need merely resist the unbalanced pressure corresponding to an area only a fraction as large as the face. In other words, with full inlet pressure effective on the lower side of the diaphragm 32 and on the upper side of valve 22, the spring need only counteract a force corresponding to the pressure on the differential in effective area between the exposed surfaces of diaphragm 32 and valve body 22. Therefore, spring 34 may be sufficiently small and elastic to move a considerable distance on a small change of pressure and still give good clean shutoff characteristics.

On the assumption, then, that the spring 34 adds to the downward fluid pressure on valve body 22 only a sufficient force to offset the upward pressure on the slightly larger diaphragm 32, when this differential of force is overcome by the pressure in inlet fitting 12, the diaphragm is urged upwardly and the valve starts to open. Pressure then builds up rapidly beneath the valve body to raise the diaphragm and valve with a snap action which elevates the valve against the relatively light spring 34 to the upper limit of movement permitted by the diaphragm. The rupture disk 17 is then subjected to the full inlet pressure. It is preferably chosen of a strength to yield at that pressure, or only a slightly greater pressure, as the safety needs of the system demand, and upon rupturing of the disk, the excess of fluid is voided to the atmosphere or to a lower pressure side.

When the pressure recedes, the reverse operation occurs. Prior to the valve reaching a point where throttling and wire drawing would take place in an ordinary valve, a resultant downward force is established on body 22, aided by spring 34 in providing a snap closing action. By contrast, in the conventional direct-action relief valve the face creeps gradually toward closed position as the pressure falls off, tending to cause leakage by wire drawing of the ledge or valve face.

The above construction has increased capacity of fluid flow, hence quick relief of the threatened system, as compared to conventional designs, not only because of the rapidity with which the valve opens under small over-pressure, but additionally because the orifice 27 is unobstructed by guides or other flow restricting details. The external lugs 23 guide the valve for exact reseating without seriously impeding fluid flow in chamber 14, throughout a long life of the valve. In a diaphragm type construction this guarantee of accuracy is very important.

In connection with the closing or reseating action of the valve, it should be pointed out that the improved face 25 and ring 24 eliminate a heretofore common tendency of intermittent acting valves to form grooves or ridges in the resilient or flexible sealing material usually associated therewith. Such grooves will occur and produce leaks unless the valve is guided unvaryingly in its movement with high precision, which is not attainable in most commercial constructions. In the described face it is not possible for this to occur, by reason of the flaring lip formation of flexible face 25 as well as the limiting function performed by ring 24.

It is therefore evident that this invention affords a valve which is rendered safe, and also leak-proof prior to rupture, by a replaceable blowout element on the discharge side; which is very rapid in its opening and closing, once critical pressures are reached, having a very desirable snap action in both directions; which has large capacity in relation to its size because of said snap action, as well as its freedom from internal obstructions; which becomes operative on a slight margin of over-pressure, by the combined use of a diaphragm and relatively light spring; and which will not develop leaks, even following many cycles of operation, by reason of the aforementioned snap action, and also because of the improved face construction employed.

I claim:

1. A pressure relief valve comprising, in combination, a valve chamber having an inlet and discharge and a valve port therebetween, said discharge being normally closed by a rupturable element extending transversely thereof on the downstream side of the valve port, a valve reciprocable in said chamber to and from closing relation to said port, a diaphragm peripherally secured to the chamber and connected to the valve to control the same, and a spring operable on the valve to urge the same toward port closing position, said diaphragm and valve being located in the chamber whereby in closed position of the valve the same is exposed and subject to closing pressure in the inlet, the diaphragm being exposed to and urged by said pressure in the opposite direction, the effective area of the diaphragm so exposed only slightly exceeding the effective area of the valve so exposed and said spring exerting a force only sufficient to offset the difference in force corresponding to a predetermined inlet pressure acting on the differential in exposed area of the valve and diaphragm.

2. In a pressure relief valve, in combination, means defining a valve chamber having inlet and discharge openings and a valve port between said openings, a valve member mounted for movement in said chamber to close and open said port, and exposed to inlet pressure acting to urge the valve member to port closing position, a flexible control member operatively connected to the valve member and exposed on a side thereof to inlet pressure acting on said control member in a direction to open the valve member relative to the port, the effective area of said control member exposed for actuation by said inlet pressure being greater than the effective area of said valve member so exposed, said control member being impervious to fluid handled by said valve and being connected to said chamber-defining means to prevent communication of said inlet pressure to the opposite side of the control member, and a rupturable element disposed to prevent flow of said fluid through said discharge opening.

3. In a pressure relief valve, in combination, means defining a valve chamber having inlet and discharge openings and a valve port between said openings, a valve member mounted for movement in said chamber to close and open said port, and exposed to inlet pressure acting to urge the valve member to port closing position, a flexible diaphragm control member operatively connected to the valve member and exposed on a side thereof to inlet pressure acting on said diaphragm control member in a direction to open the valve member relative to the port, the effective area of said control member exposed for actuation by said inlet pressure being greater than the effective area of said valve member so exposed, said control member being impervious to fluid handled by said valve and being connected to said chamber-defining means to prevent communication of said inlet pressure to the opposite side of the control member, and a rupturable element disposed on the downstream side of said port and in sealing relation to said discharge opening to prevent flow of said fluid through said discharge opening.

GUY J. HENRY.

REFERENCES CITED

The following references are of record in the file of this patent:

UNITED STATES PATENTS

| Number | Name | Date |
| --- | --- | --- |
| 633,421 | Bryan | Sept. 19, 1899 |
| 1,210,913 | Dougherty | Jan. 2, 1917 |
| 1,290,030 | Acebal | Jan. 7, 1919 |
| 2,179,165 | Sifkovitz | Nov. 7, 1939 |
| 2,239,169 | Franck | Apr. 22, 1941 |
| 2,272,318 | Dennis | Feb. 10, 1942 |
| 2,343,901 | Groves | Mar. 14, 1944 |
| 2,397,269 | Kelly | Mar. 26, 1946 |